United States Patent [19]

Gytel

[11] 4,390,445
[45] Jun. 28, 1983

[54] ALUMINIUM CHLORIDE COMPOSITION AND A METHOD FOR ITS MANUFACTURE

[76] Inventor: Ulla B. Gytel, Villa Linnea, Ramlösa Brunns Park, S-253 67 Helsingborg, Sweden

[21] Appl. No.: 357,179

[22] Filed: Mar. 11, 1982

[30] Foreign Application Priority Data

Mar. 23, 1981 [SE] Sweden .................. 8101829

[51] Int. Cl.³ .................. C02F 5/02; C02F 5/08; C01F 7/56
[52] U.S. Cl. .................. 252/175; 423/462
[58] Field of Search .................. 252/175; 423/462

[56] References Cited

U.S. PATENT DOCUMENTS

| 3,497,459 | 2/1970 | Nakamura et al. | 252/175 |
| 3,894,144 | 7/1975 | Becher et al. | 423/462 |

FOREIGN PATENT DOCUMENTS

| 2428002 | 4/1980 | France . |
| 75050633 | 5/1974 | Sweden . |
| 78051356 | 5/1978 | Sweden . |
| 79026514 | 3/1979 | Sweden . |
| 76077825 | 8/1981 | Sweden . |
| 1548620 | 7/1979 | United Kingdom . |

Primary Examiner—John E. Kittle
Assistant Examiner—Robert A. Wax

[57] ABSTRACT

The invention relates to aluminium-chloride compositions for water-purifying, sludge-dewatering and plant-dewatering purposes, comprising a clear, stable aqueous solution of aluminium chloride containing polynuclear complexes of the kind $$Al_m(OH)_n^{(3m-n)+}$$

where m and n are positive integers. The composition is characterized in that it contains ions of alkali metal and/or alkaline earth metal in an amount which stoichiometrically substantially corresponds to the OH-content of the solution, and in that the total aluminium content is between about 0.3 and about 2 mole per liter. At least 40% of the total aluminium content of the solution may be present in the form of said polynuclear complexes.

The invention also relates to a method for producing the composition, in which method a carbonate or hydrocarbonate, alkali metal or alkaline earth metal and an aluminium chloride are brought into aqueous solution. The amount of aluminium chloride is selected so as to obtain in the solution a total aluminium content of between about 0.3 and about 2 mole per liter, and the amount of carbonate or hydrocarbonate is selected so that, in relation to the amount of aluminium chloride, a given highest ratio is obtained between the number of moles of OH and the total number of moles of aluminium in the resultant solution at the desired given aluminium content of the solution.

8 Claims, No Drawings

ALUMINIUM CHLORIDE COMPOSITION AND A METHOD FOR ITS MANUFACTURE

DESCRIPTION

1. Technical Field

The present invention relates to an aluminium chloride composition for water-purifying, sludge-dewatering and plant-dewatering purposes, comprising a clear, stable aqueous solution of aluminium chloride containing polynuclear complexes of the kind $$Al_m(OH)_n^{(3m-n)+}$$

where m and n are positive integers.

2. Background of the Invention

Two principally different kinds of aluminium chloride solutions containing such polynuclear complexes are known to the art. One kind is the so-called PAC-solutions which include polynuclear complexes, having a general empirical formula which can be written as:

$$[AlCl_x(OH)_{3-x}]_n$$

where x is smaller than 3, normally 1-2.

Such compounds are described, for example, in Nos. SE,B,7201333-7, SE,B,7405237-4, SE,B, 7412965-1, SE,B, 7503641-8 and DE,A, 2630768. A feature common to all PAC-type compositions containing aluminium chloride and based on polynuclear complexes is that extremely complicated methods are required to produce an effective solution, e.g. a solution which will effectively purify water, and hence the price demanded by the solutions is relatively high when seen against the effect they produce.

The other type of aluminium chloride-solutions, PALC, which are also based on the same polynuclear complex content as the PAC solutions, have the general, empirical formula $$[AlCl_3 \cdot x\, AOH]_n$$

where A is an alkali metal, and $$AlCl_3 \cdot x/2 B(OH)_2\ _n$$

where B is an alkaline earth metal, and n is a positive integer, and x is a number in the range 1-2.7.

PALC-type polynuclear aluminium chloride solutions are found described in FR,AL, No. 7512975, according to which the solutions are produced by alkalizing aluminium chloride solutions with solutions of alkali hydroxide. However, according to this published reference, clear stable solutions cannot be produced other than in a highly diluted state. By "stable solution" is meant here, and in the following, a solution which remains unchanged with respect to its composition and properties, even when stored for long periods of time. Thus, it is given in the aforementioned reference that a solution containing up to 0.40 mole Al per liter can be obtained under certain conditions. However, this solution has a greatly limited stability, and must be injected directly into the water to be purified. It is apparent from the publication, and in particular from the working examples therein, that solutions having a higher concentration of aluminium than approximately 0.1 mole/l cannot be expected to be effective and stable in the known PALC-solutions according to the publication.

However, an important advantage with this second type of polynuclear aluminium chloride composition, i.e. PALC-solutions, is that it ought to be possible to produce said solutions much more cheaply than the earlier discussed PALC-solutions, owing to the far less complicated production methods required, and thereby to compete with said PAC-solutions, provided that the PALC-solutions can be made sufficiently effective. The effectiveness of the solutions can only be increased by increasing either the total aluminium content of the solutions or the percentage of aluminium present in the form of polynuclear complexes, or by increasing both contents. Those PALC-solutions known hitherto have been unable to compete with the more expensive PAC-solutions because it has not been possible to produce PALC-solutions which will retain their stability at sufficiently high concentrations.

DISCLOSURE OF THE PRESENT INVENTION

It has now surprisingly been found possible to produce substantially improved PALC-solutions which are not encumbered with the disadvantages and limitations normally credited to those above mentioned solutions. The invention is based on the surprising stabilizing effect obtained when using carbonates or hydrocarbonates of alkali metals or alkaline earth metals as an alkalizing agent in the preparation of the solutions. The term alkali metal as used here and in the following is also considered to include ammonium ions. The stabilizing effect of the carbonate or hydrocarbonate on the solutions has not been fully established. It has not been possible to show residues of carbonate in the solutions when applying conventional analyzing methods. Nevertheless, it would seem probable that extremely small trace quantities of residual carbonate are present and that these trace quantities co-act synergistically with the polynuclear complexes formed during the alkalization process, such that the resultant solutions remain stable over much wider concentration ranges and for a much longer period of time than was previously possible.

The novel PALC-type aluminium compositions including polynuclear complexes according to the invention are thus stable aqueous solutions, which are characterized in that they contain ions of alkali metal and/or alkaline earth metals in an amount which substantially corresponds stoichiometrically to the OH-content of the solutions, and in that the total aluminium content is about 0.3-2 mole per liter. Solutions which are particularly effective can be obtained according to the invention, wherein at least about 40% of the total aluminium content is present in the form of a polynuclear complex of the type described in the introduction. If desired, compositions according to the invention can be obtained in which more than about 80% of the aluminium content is present in the form of said polynuclear complex at a total aluminium content which does not exceed about 1.6 moles per liter.

The novel PALC-solutions according to the invention may thus contain from about 1.5 up to 8.3% by weight $Al_2O_3$, corresponding to an aluminium content of about 0.32-2.0 mole/l, depending on the desired polynuclear content, which in turn depends on the maximum extent to which the solutions can be alkalized without hydroxides precipitating out.

According to another aspect of the invention, there is provided a method for producing the novel aluminium-chloride composition, said method being characterized by bringing a carbonate or hydrocarbonate of alkali metal or alkaline earth metal and an aluminium chloride into aqueous solution; selecting the amount of aluminium chloride so that the solution contains a given total aluminium content of between about 0.3 and about 2 mole per liter; and selecting the amount of carbonate or hydrocarbonate in relation to the amount of aluminium chloride so that the ratio between the number of moles of OH and the total number of moles of aluminium in the resultant solution does not appreciably exceed the value determined by the following associated values:

| Al mol/l | OH/Al mole ratio |
|---|---|
| 0.32 | 2.4 |
| 1.0 | 2.25 |
| 1.65 | 2.0 |
| 1.8 | 1.5 |
| 2.0 | 1.0 |

PALC-solutions according to the invention are suitably prepared by alkalizing concentrated $AlCl_3$-solutions with carbonate or hydrocarbonate of an alkali metal or alkaline earth metal. A suitable alkalizing agent is sodium carbonate, i.e. soda, since this is a particularly cheap raw material. The alkalizing process is relatively rapid at room temperature, and is normally finished in less than 1 hour. Carbon dioxide is driven off during the alkalizing process, and hence the solution must be vigorously agitated during said process, so as to accelerate the expulsion of carbon dioxide. In concentrated solutions the extent to which the solutions can be alkalized is restricted by the solubility of the carbonate, and in more dilute solutions by the risk of aluminium hydroxide precipitating. Consequently, the degree of alkalization can never exceed 1.25 mole carbonate or 2.5 mole hydrocarbonate per mole $AlCl_3$, i.e. an OH/Al-ratio=2.5:1. Alternatively, alkalization may be carried out substantially simultaneously with the solution of solid aluminium chloride, without affecting the properties of the resultant solution. Preferred alternative embodiments of the method are set forth in claims 5–8.

In the following Table 1 there is given the maximum degree of alkalization, expressed as the mole ratio OH/Al at different total aluminium contents, $Al_{tot}$, in the solution, and the calculated degree of polynucleation. Polynucleation is expressed as the percentage of the total aluminium content present in the form of polynuclear complexes.

TABLE I

| $Al_{tot}$ mole/l | Max. degree of alkalization mole ratio OH/Al | $g/cm^3$ | $Al_2O_3$ % | Polynucleation % |
|---|---|---|---|---|
| 2.0 | 1 | 1.23 | 8.3 | 40 |
| 1.8 | 1.5 | 1.22 | 7.5 | 60 |
| 1.65 | 2.0 | 1.22 | 6.8 | 80 |
| 1.0 | 2.25 | 1.14 | 4.5 | 90 |
| 0.32 | 2.4 | about 1.08 | about 1.5 | 96 |

The prepared solutions remain stable for several months at room temperature, and can be diluted with at least 10 times without risk of precipitation.

The invention will now be described in more detail with reference to the following non-limitive examples, which illustrate the properties of the compositions as flocculating agents.

EXAMPLE 1

77.2 g of $AlCl_3 \cdot 6H_2O$ (0.32 moles) were dissolved in 900 ml of water, whereupon 40.7 g of $Na_2CO_3$ were added successively during violent stirring. $CO_2$ is allowed to leave the solution, whereafter the solution becomes clear. Water is added to a total volume of 1000 ml.

EXAMPLE 2

PALC-solutions having different polynuclear contents (40, 80 and 90% respectively) were tested as flocculating agents on a laboratory scale and compared with three other flocculating agents, namely ALG, i.e. commercial granulated aluminium sulphate, FALS, i.e. alkalized aluminium sulphate solution, and a commercial PAC-quality (SACHTOKLAR). Clear solutions containing 0.32 moles Al per liter (corresponding to 100 g of ALG per liter) were prepared from these flocculating agents. The flocculating tests were carried out according to the following procedure. The chemicals were added to the water to be purified while rapidly agitating the water for 10 seconds, whereafter the formation of flocs was allowed to take place for twenty minutes while slowly stirring the water at a peripheral speed of 0.1 m per second. A period of 10 minutes was allowed for sedimentation, whereafter a 200 ml sample was sucked from the surface of the water for analysis. In a first series of tests, flocculating experiments were made on water taken from Lussebäcken. The results of these tests are set forth in Table II. This Table shows the flocculating results firstly as the resultant residual turbidity expressed in FTU, i.e. Formazin Turbidity Units, whereat a high value corresponds to a high degree of turbidity, and secondly as a visual assessment of the formation of flocs, called "Flock". The results show that the PALC-solutions with the highest polynuclear content possessed better flocculating properties than both ALG and FALS and are fully comparable with the substantially more expensive PAC-products (SACHTOKLAR). Flocculation has been carried out with two different metered quantities of aluminium, namely 3.5 mg/l and 2.6 mg/l respectively. In a first series of tests, the flocculating chemicals were metered to the contaminated water without previously adjusting the pH, while in two experiments the pH was lowered somewhat prior to introducing the chemicals into the water.

EXAMPLE 3

A second series of tests was carried out analogously with the procedure taken in Example 2, whereat flocculation was carried out on biologically purified sewage water taken from Helsingborg's sewage purification plant. The test results are set forth in Table III, which shows that the PALC-solutions containing the most polynucleates possessed better flocculating properties than ALG and FALS. The precipitation of phosphorous was approximately the same with all flocculating chemicals, but at the time of making the tests the sewage water contained very little phosphorous, less than 1 mg/l and hence these results are not generally applicable.

TABLE II

Flocculation of water from Lussebacken having pH 7.9 turbidity 6.5 FTU

| Flocculating Chemical | Dosage 3.5 mg/l Al No pH adjustment | | | Dosage 3.5 mg/l Al pH adjusted | | | Dosage 2.6 mg/l Al pH adjusted | | |
|---|---|---|---|---|---|---|---|---|---|
| | pH | Turbidity FTU | Floc* | pH | Turbidity FTU | Floc* | pH | Turbidity FTU | Floc* |
| ALG | 7.3 | 4.7 | 2 | 6.4 | 4.6 | 2 | 6.4 | 4.0 | 2 |
| FALS | 7.4 | 3.3 | 3 | 6.5 | 3.5 | 3 | 6.5 | 3.1 | 3 |
| PALC (polynuclear degree 40%) | 7.5 | 3.7 | 2 | 6.5 | 4.5 | 2 | 6.5 | 4.1 | 2 |
| PALC (polynuclear degree 80%) | 7.7 | 3.2 | 5 | 6.5 | 3.4 | 3 | 6.5 | 3.2 | 3 |
| PALC (polynuclear degree 90%) | 7.8 | 3.3 | 5 | 6.5 | 2.8 | 4 | 6.5 | 2.5 | 4 |
| PAC (SACHTOKLAR) | 7.7 | 3.2 | 5 | 6.5 | 2.8 | 4 | 6.5 | 2.5 | 4 |

*The formation of flocs is graded from 0 to 5, where 2 is normal flocculation and 5 is much better than normal.

It has previously been known that products having a high content of polynuclear aluminium-hydroxide complexes, e.g. PAC, precipitate less phosphorous than aluminium sulphate in corresponding amounts, a fact which is partly compensated by the good floc separation, however. Tests have been carried out in which two different quantities were metered to the water, namely, quantities corresponding to 8.6 mg/l Al and 4.3 mg/l Al, as will be seen from Table III below.

TABLE III

Flocculation of biologically purified sewage water from Helsingborg (pH 7.6; turbidity 2.7 FTU; $P_{tot}$ 0.93 mg/l)

| Flocculating Chemical (Degree of polynucleation in %) | Dosage 8.6 mg/l Al | | | | Dosage 4.3 mg/l Al | | | |
|---|---|---|---|---|---|---|---|---|
| | pH | Turb. FTU | $P_{tot}$ mg/l | Flock* | pH | Turb. FTU | $P_{tot}$ mg/l | Flock* |
| ALG | 6.9 | 2.4 | 0.21 | 2 | 7.1 | 2.8 | 0.41 | 2 |
| FALS | 7.0 | 2.4 | 0.19 | 3 | 7.2 | 2.5 | 0.36 | 3 |
| PALC (40%) | 7.0 | 2.3 | 0.20 | 3 | 7.2 | 3.1 | 0.47 | 2 |
| PALC (80%) | 7.2 | 1.7 | 0.18 | 3 | 7.4 | 2.5 | 0.40 | 3 |
| PALC (90%) | 7.3 | 1.1 | 0.17 | 5 | 7.4 | 1.8 | 0.44 | 5 |
| PAC (Sachtoklar ~ 75%) | 7.2 | 0.8 | 0.14 | 5 | 7.2 | 1.7 | 0.39 | 5 |

*Flock formation was graded between 0 and 5, where 2 is normal flocculation and 5 is much better than normal.

I claim:

1. An aluminium-chloride composition for water-purifying, sludge-dewatering retention of fiber and filler in papermaking systems, and plant-dewatering purposes, comprising a clear, stable aqueous solution of aluminium chloride containing polynuclear complexes of the kind $$Al_m(OH)_n^{(3m-n)+}$$

where m and n are positive integers, characterized in that said composition contains ions of alkali metal and/or alkaline earth metal in an amount which stoichiometrically substantially corresponds to the OH content of the solution; and that the total aluminium content is between about 0.3 and about 2 mole per liter.

2. A composition according to claim 1, characterized in that at least 40% of the total aluminium content is present in the form of said polynuclear complexes.

3. A composition according to claim 1 and 2, characterized in that more than about 80% of the aluminium content is present in the form of said polynuclear complexes at a total aluminium content not exceeding about 1.6 mole per liter.

4. A method for producing the composition according to any one of the preceding claims, characterized by bringing a carbonate or hydrocarbonate of alkali metal or alkaline earth metal and an aluminium chloride into aqueous solution; selecting the amount of aluminium chloride so that a given total aluminium content of between about 0.3 and about 2 mole per liter is obtained in the solution; and selecting the amount of carbonate or hydrocarbonate so that in relation to the amount of aluminium chloride the ratio between the number of moles of OH and the total number of moles of aluminium in the resultant solution does not appreciably exceed the value determined by the following associated values:

| Al mole/Al | OH/Al mole ratio |
|---|---|
| 0.32 | 2.4 |
| 1.0 | 2.25 |
| 1.65 | 2.0 |
| 1.8 | 1.5 |
| 2.0 | 1.0 |

5. A method according to claim 4, in which the aluminium chloride is dissolved in solid form in water, whereafter the carbonate or hydrocarbonate is added to the solution.

6. A method according to claim 4, wherein the carbonate or hydrocarbonate and the aluminium chloride in solid form are dissolved in water substantially simultaneously.

7. A method according to claim 6, wherein the carbonate or hydrocarbonate and the aluminium chloride in solid form are mixed in a mixing vessel in given proportions, and wherein the resultant mixture is dissolved in water.

8. A method according to claim 7, wherein the mixture is agglomerated, preferably by compaction or granulation.

* * * * *

UNITED STATES PATENT AND TRADEMARK OFFICE
CERTIFICATE OF CORRECTION

PATENT NO. : 4,390,445
DATED : June 28, 1983
INVENTOR(S) : ULLA B. GYTEL

It is certified that error appears in the above—identified patent and that said Letters Patent is hereby corrected as shown below:

Col. 1, line 50, "FR,AL," should read -- FR,Al, --;

Col. 2, line 5, "PALC-solutions" should read -- PAC-solutions --;

Col. 5, line 2, after "7.9" insert -- and --;

Col. 6, line 41, "mole/Al" should read -- mole/l --.

Signed and Sealed this

Twenty-seventh Day of September 1983

[SEAL]

Attest:

GERALD J. MOSSINGHOFF

Attesting Officer   Commissioner of Patents and Trademarks